United States Patent [19]

Kumazaki

[11] Patent Number: 4,735,760
[45] Date of Patent: Apr. 5, 1988

[54] METHOD AND APPARATUS FOR CONTROLLING INJECTION STEP OF INJECTION MOLDING MACHINES

[75] Inventor: Hiroshi Kumazaki, Numazu, Japan

[73] Assignee: Toshiba Kikai Kabushiki Kaisha, Tokyo, Japan

[21] Appl. No.: 898,925

[22] Filed: Aug. 21, 1986

Related U.S. Application Data

[63] Continuation-in-part of Ser. No. 694,417, Jan. 24, 1985, abandoned.

[51] Int. Cl.[4] .............................................. B29C 45/03
[52] U.S. Cl. ................................ 264/40.5; 264/40.1; 264/328.1; 425/149; 425/214; 425/542; 425/555
[58] Field of Search .................... 264/40.1, 40.5, 328.8, 264/328.13, 40.3, 328.1; 425/147, 149, 563, 214, 555, 542

[56] References Cited

U.S. PATENT DOCUMENTS

| | | | |
|---|---|---|---|
| 3,920,367 | 11/1975 | Ma et al. | 425/149 |
| 3,932,083 | 1/1976 | Boettner | 425/145 |
| 4,060,362 | 11/1977 | Wilson, III | 425/145 |
| 4,407,649 | 10/1983 | Saito | 425/145 |

FOREIGN PATENT DOCUMENTS

| | | |
|---|---|---|
| 0057638 | 4/1982 | Japan . |
| 0191036 | 11/1982 | Japan . |
| 0191037 | 11/1982 | Japan . |
| 0201637 | 12/1982 | Japan . |

Primary Examiner—Jan H. Silbaugh
Assistant Examiner—Mary Lynn Fertig
Attorney, Agent, or Firm—Koda and Androlia

[57] ABSTRACT

In an injection molding machine which injects molten metal into a metal mold cavity by an injection step and a succeeding pressure holding step, the injection step is controlled by the steps of filling the molten resin into the metal mold cavity at a high speed during the filling step; switching the injection operation from the filling step to the pressure holding step; concurrently operating braking means for applying a braking force to the plunger of the injection molding machine for stopping the plunger; and locking the braking means for continuously applying a constant force to the plunger until a gate seal of the metal mold cavity is completed.

4 Claims, 1 Drawing Sheet

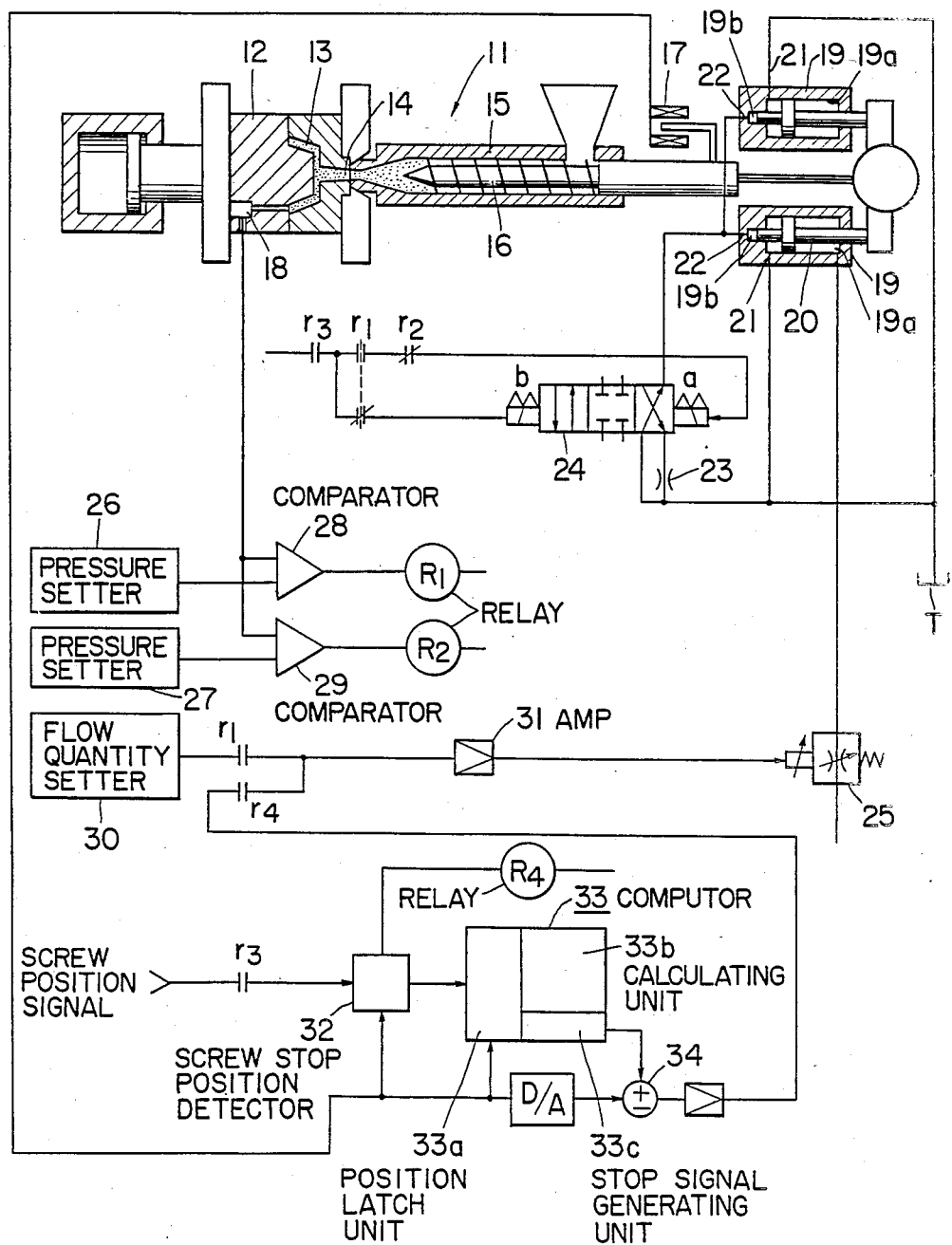

METHOD AND APPARATUS FOR CONTROLLING INJECTION STEP OF INJECTION MOLDING MACHINES

This is a continuation-in-part application of Ser. No. 694,417, filed Jan. 24, 1985 now abandoned.

BACKGROUND OF THE INVENTION

This invention relates to a method and apparatus for controlling the injection step of an injection molding machine utilized for effecting precise molding.

To effect precise molding, the injection step must be controlled to provide precise filling and pressure maintenance or holding. More particularly; during the filling step, for the purpose of minimizing as far as possible the viscosity difference between the leading end and the trailing end of molten resin flowing into a metal mold cavity, it is necessary to fill the molten resin in a shortest time, while in the pressure holding step succeeding the filling step, it is necessary to adequately compensate for a shrinkage caused by the cooling of the molten resin filled into the metal mold cavity. Consequently, it is essential to effect switching in a short time from the filling step to the pressure holding step while maintaining a correct switching position and stability of repetition.

As a result of careful observation of the performance of the molten resin in the metal mold cavity, during the filling and pressure holding steps it has been noted that the degree of forming a skin layer is determined by the thermal balance as follows.

1. Heat supplied by the molten resin, heat generated by internal friction, and heat generated by compression.
2. Heat loss caused by heat conduction and thermal expansion.

Consequently, so long as the temperature of the molten resin and the temperature of the cavity surface are the same, larger is the flow speed, slower is the growth of the skin layer. Taking a polycarbonate resin as an example, the flow resistance is shown by the following equation.

$$\Delta p \; \alpha \; V^{0.83} \times \frac{L}{H} \times \frac{1}{H^{0.83}}$$

where
P: dynamic pressure loss
V: mean flow quantity
L: flow distance
H: height of cavity section.

As can be noted from this equation, when the flow speed decreases and the growth of the skin layer proceeds, the force necessary to cause flow becomes large with the result that unwanted stress would be applied to the skin layer. In this manner, the higher is the injection speed during the filling step, the slower is the speed of growth of the skin layer which improves the accuracy influenced by the internal stress, that is the dimensional accuracy, mechanical accuracy, physical strength, etc. However, there is a tendency that such defects as flow marks and silver streaks are formed on the surface of the product and that switching from the filling stroke to the pressure holding step becomes unstable. For avoiding these defects it has been the practice to adopt a programmed injection method in which the injection stroke is divided into a plurality of stages of different filling speeds.

Although according to this method it is possible to fill the molten resin by variously varying the filling speed, after switching to the pressure holding step, the control necessary to compensate for the shrinkage caused by the cooling of the molten resin filled in the mold cavity becomes difficult.

During the pressure holding step, the flow of the molten resin is substantially zero and the amount of heat loss is much larger than the quantity of heat generated, whereby the thickness of the skin layer increases rapidly. At this time, if the molten resin flows, stress is applied to the skin layer under growth, thus failing to ensure the accuracy.

I have made various investigations for finding out a method that can perfectly stop the axial movement of a screw or plunger (in the following description both are represented by a term plunger) that directly gives a flow to the molten resin during the pressure holding step and found the following. When melted, resinous materials are compressible liquids having a compressibility of 4-5% under a pressure of 600 Kg/cm$^2$ and of 8-12% under a pressure of 1000 Kg/cm$^2$, although different depending upon the type of the resins. For this reason, after the molten resin has been filled in the mold cavity under a precisely controlled pressure, satisfactory product can be obtained by rapidly removing external pressure, so as to compensate for the shrinkage of the product by releasing the pressure accumulated in the product. In other words, it is advantageous that the product is formed while dissipating the internal stress of the product. This invention is based on this discovery.

SUMMARY OF THE INVENTION

It is therefore an object of this invention to provide a novel method and apparatus for controlling the injection steps capable of producing high quality precise molded products free from stress.

According to one aspect of this invention there is provided a method of controlling the injection step of an injection molding machine, the injection step including a filling step and a succeeding pressure holding step, characterized by comprising the steps of filling molten resin into a metal mold cavity at a high speed during the filling step; switching the injection operation from the filling step to the pressure holding step; concurrently operating braking means for applying a braking force to the plunger of the injection molding machine for stopping the plunger; and locking the braking means for continuously applying a constant force to the plunger to prevent pushing back by the pressure of the molten resin in the mold cavity for maintaining a constant position until a gate seal of the metal mold cavity is completed.

According to another feature of this invention, there is provided apparatus for controlling an injection step of an injection molding machine, the injection step including a filling step and a succeeding pressure holding step, the injection molding machine including a metal mold cavity, a plunger injecting molten resin into the metal mold cavity, and an injection cylinder operated by pressurized oil for reciprocating the plunger, characterized by comprising means for switching an injection operation from the filling step to the pressure holding step, braking means provided for the injection cylinder, means for operating the braking means concurrently with the operation of the switching means for stopping the plunger, means for locking the braking means for continuously applying a constant force to the plunger to prevent pushing back by the pressure of the molten resin in the mold cavity and to maintain a constant position until a gate seal of the mold cavity is completed and the injection cylinder has a larger diameter portion, a smaller diameter portion, a piston movable in the larger diameter portion, a piston rod with one end operatively connected with the plunger and the other end receivable in the smaller diameter portion for forming the breaking means, and means for throttling draining of the pressurized oil from the smaller diameter portion when the other end is received in the smaller diameter portion.

BRIEF DESCRIPTION OF THE DRAWING

In the accompanying drawing, a single FIGURE diagrammatically shows a preferred embodiment of the apparatus of this invention.

DETAILED DESCRIPTION OF THE INVENTION

The apparatus shown in FIG. 1 comprises an injection molding machine 11, and a metal mold 12 made up of a stationary mold and a movable mold which define mold cavity 13 therebetween. The cavity 13 is connected to a heating cylinder 15 via a gate 14 so that when a screw or plunger 16 is advanced during the filling step, the molten resin accumulated in a space in front of the screw 16 will be injected into the mold cavity 13. There are also provided a screw position detector 17, a pressure sensor 18 for detecting the pressure in the metal mold, and injection cylinders 19 for reciprocating injection pistons 20 and hence reciprocating the screw 16 in the axial direction. Each injection cylinder 19 is provided with a cushion chamber 19b having a diameter smaller than that of an oil chamber 19a on the front side (righthand side as viewed in the drawing) so that the injection piston 20 will be decelerated near its limit of advance when the injection piston 20 reaches a position which is denied by the position detector 17 wherein it enters the cushion chamber 19b. Thus, when the injection piston 20 is advanced, before it enters into the cushion chamber 19b, the return oil from the injection cylinder 19 is discharged through a discharge opening 21. However, after the injection piston 20 reaches the position wherein it has entered into the cushion chamber 19b, the return oil is discharged through a discharge opening 22 provided for the cushion chamber 19b and a throttle valve 23. Since the diameter of the cushion chamber 19b is made to be considerably smaller than that of the oil chamber 19a, as the piston 20 enters into the cushion chamber 19b, the piston 20 would be braked at once. Thus, piston 20 and cushion chamber constitute brake means. There are also provided an electromagnetic switching valve 24 which controls the injection cylinder 19, an electromagnetic flow control valve 25 which controls the flow quantity of the pressurized oil acting upon the injection cylinder 19 and pressure setters 26 and 27 for presetting two different predetermined pressures in the cavity 13. Comparators 28 and 29 are provided to respectively compare the pressure in the cavity 13 detected by the pressure sensor 18 with the two different pressures set by pressure setters 26 and 27. When the sensed pressures coincide with the two different preset pressures, the comparators 28 and 29 operate relays $R_1$ and $R_2$ respectively. Furthermore, there is provided a flow quantity setter 30 that controls the electromagnetic control valve 25 through an amplifier 31, and a screw stop position detector 32 which, in response to a screw position signal from a controller, not shown, and the output of the screw position detector 17, judges whether or not the screw has stopped at a predetermined position which is after the portion wherein the injection piston 20 enters the cushion chamber 19b. A computer 33 comprises a position latch unit 33a, calculating unit 33b a stop signal generating unit 33c. A comparator 34 compares the output signal of the position detector 17 with the output signal from the calculating unit 33b and the output of the comparator 34 is fed back to the electromagnetic flow control valve 25 so as to control the same such that the output signal of the position detector 17 will normally coincide with the output signal from the calculating unit 33b which sets the predetermined stopping position.

The apparatus shown in the accompanying drawing operates as follows: At the time of injecting the molten resin into the metal mold cavity, pressurized oil is applied to the injection cylinders 19 to advance the screw at a high speed from the retracted position. Injection of the molten resin into the mold cavity 13 is detected by the pressure sensor 18. When the pressure thus detected reaches a value set by the pressure setter 16, relay $R_1$ operates to close its normal open contact $r_1$. Since the normal open contact $r_3$ of an injection signal relay, not shown, is closed at the commencement of the injection step, the electromagnetic switching valve 24 is transferred from position a to position b to discharge the return oil from the cushion chambers 19b to a drain tank T via a throttle valve 23 when the injection piston 20 reaches the position wherein it enters the cushion chamber 19b to decelerate the injection piston 20. At the same time, as the result of closure of contact $r_1$ the electromagnetic flow control valve 25 controls the quantity of the oil supplied to the injection cylinders 19 in accordance with the setting of the flow quantity setter 30. When the pressure in the cavity reaches the value set by the pressure setter 27, relay $R_2$ operates to open its normal close contact $r_2$ whereby the electromagnetic transfer valve 24 is brought to the neutral position, thus blocking the flow of the return oil from the injection cylinders 19. The electromagnetic flow control valve 25 is controlled by the feedback signal from the calculating unit 33b such that the injection piston 20 would be stopped and maintained at the predetermined stopping position so as to prevent the injection pistons 20 from moving rearwardly by the oil pressure in the cushion chambers 19b and the molten resin pressure in the mold cavity when the screw is stopped.

As above described, since the invention provides a mechanical brake device that alleviates shocks caused by flow due to inertia or rapid stop, there is no fear of applying shocks to the injection machine and it can accurately stop the plunger at the pedetermined position. Moreover, as it is possible to inject the molten resin in the mold cavity under a precisely predetermined pressure, to switch to the pressure holding step and to quickly interrupt the communication between the mold cavity and the screw or plunger, the screw or plunger is stopped until the gate seal is completed for sealing the molten metal in the mold cavity under a compressed state. Consequently, the filled molten resin does not move during the pressure holding step and the shrinkage of the molded product caused by the cooling and solidification can be automatically compensated for by releasing a compressive force stored in the molded product. Thus, it is possible to obtain precisely molded product free from stress.

I claim:

1. A method of controlling the injection operation of an injection molding machine, the injection operation including a filling step and a succeeding holding step, said method comprising the steps of:

filling molten resin into a mold cavity at a high speed during the filling steps by moving a plunger or screw;

switching the injection operation from the filling step to the pressure holding step when the pressure in the mold cavity reaches a first pressure;

concurrently operating braking means for applying a braking force to the plunger of the screw of the injection machine for decelerating the plunger or the screw when the plunger or the screw has reached a first position;

locking the braking means when the mold cavity reaches a second pressure for continuing the application of a constant force to said plunger or screw; and maintaining said plunger or screw at a predetermined second position until a gate seal of said metal mold cavity is completed.

2. A method according to claim 1 wherein said first and second position are detected by a position sensor.

3. A method according to claim 1 wherein the pressure in the mold cavity is detected by a pressure sensor.

4. An apparatus for controlling an injection operation of an injection molding machine, said injection operation including a filling step and a succeeding pressure holding step, and said injection molding machine including a mold cavity, a plunger or screw for injecting molten resin into said mold cavity and an injection cylinder operated by pessurized oil for reciprocating said plunger or screw, said apparatus comprising:

means for switching an injection operation from said filling step to said pressure holding step;

braking means provided for said injection cylinder;

means for operation said braking means concurrently with the operation of said switching means for decelerating said plunger or screw; and means for locking said braking means for continuously applying a constant force to said plunger or screw to maintain said plunger or screw at a predetermined stop position until a gate seal of said mold cavity is completed; and said injection cylinder having a large diameter portion, a smaller diameter portion, a piston movable in said larger diameter portion, a piston rod with one end operatively connected with said plunger and the other end receivable in said smaller diameter portion for forming said braking means, and means for throttling drain of the pressurized oil from said smaller diameter portion when said other end is received in said smaller diameter portion.

* * * * *